(12) United States Patent
Richards et al.

(10) Patent No.: US 11,307,780 B2
(45) Date of Patent: Apr. 19, 2022

(54) CLUSTER GROUP CHANGE PREPARATION TECHNIQUES

(71) Applicant: EMC IP Holding Company LLC, Hopkinton, MA (US)

(72) Inventors: Antony Richards, Rose Bay (AU); Douglas Kilpatrick, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 16/750,713

(22) Filed: Jan. 23, 2020

(65) Prior Publication Data

US 2021/0232328 A1 Jul. 29, 2021

(51) Int. Cl.
*G06F 3/00* (2006.01)
*G06F 3/06* (2006.01)
*G06F 9/54* (2006.01)

(52) U.S. Cl.
CPC ............ *G06F 3/0629* (2013.01); *G06F 3/067* (2013.01); *G06F 3/0614* (2013.01); *G06F 3/0644* (2013.01); *G06F 3/0653* (2013.01); *G06F 3/0659* (2013.01); *G06F 3/0683* (2013.01); *G06F 9/542* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 9,747,323 B1* | 8/2017 | Kilpatrick | G06F 16/1774 |
| 10,938,897 B2* | 3/2021 | Richards | G06F 16/1774 |
| 2020/0026810 A1* | 1/2020 | Subramaniam | G06F 9/5077 |
| 2021/0227018 A1* | 7/2021 | Richards | H04L 67/10 |

* cited by examiner

*Primary Examiner* — Midys Rojas
(74) *Attorney, Agent, or Firm* — Amin, Turocy & Watson, LLP

(57) ABSTRACT

Described herein are technologies directed to cluster group change preparation techniques. Prior to a cluster group change operation, such as a merge or a split of a node with a group, a notification of a planned group change operation can be sent to the nodes of a group. In response to the notification, the nodes of the group can perform group change preparation operations disclosed herein. The group change operation can be blocked while the group change preparation operations are underway. The group change operation can proceed after the nodes of the group indicate completion of the group change preparation operations.

20 Claims, 10 Drawing Sheets

CLUSTER GROUP CHANGE PREPARATION TECHNIQUES

TECHNICAL FIELD

The subject disclosure relates generally to computing clusters, namely, groups of connected, collectively managed, cooperating computing devices.

BACKGROUND

Computing clusters have become important in today's business and technical landscape. Computing clusters generally include multiple connected computing devices, referred to as nodes, which can work together as a single system in some respects. In some clusters, nodes are controlled and scheduled by software. The nodes can be connected to each other for example through fast local area networks, with each node running its own instance(s) of an operating system. The operations of the nodes can be sufficiently redundant to insure against failure of any single node. In some clusters, all of the nodes use the same hardware and operating system, although in other clusters, different operating systems or different hardware can be used at different nodes.

The nodes of a cluster can optionally be organized in one or more groups, wherein a group can comprise a subset of the cluster's nodes. Furthermore, clusters can make changes to groups as needed. So-called "merge" operations involve a node merging into a group of other nodes within a cluster. In contrast, "split" operations involve a node leaving a group of nodes. Because the nodes of a group cooperate tightly, group changes can involve a significant amount of processing to integrate or separate a node from a group. Managing cluster group change processing for improved efficiency and reliability is an ongoing challenge in the industry.

The above-described background is merely intended to provide a contextual overview of some current issues and is not intended to be exhaustive. Other contextual information may become further apparent upon review of the following detailed description.

DETAILED DESCRIPTION

Figure 1:
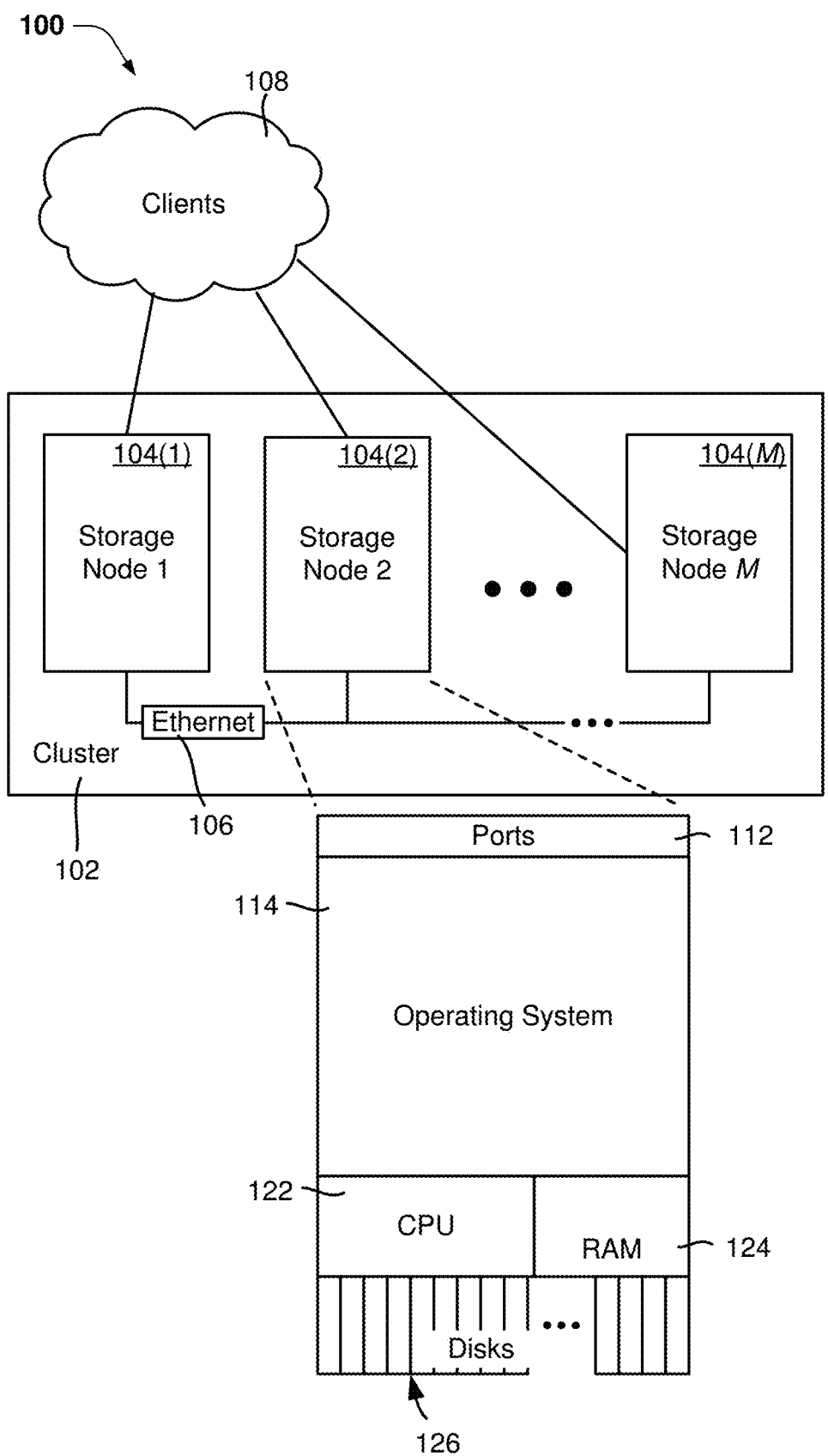
FIG. 1 illustrates an example cluster of computing devices, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to cluster group change preparation techniques. Prior to a cluster group change operation, such as a merge or a split of a node with a group, a notification of a planned group change operation can be sent to the nodes of a group. In response to the notification, the nodes of the group can perform group change preparation operations disclosed herein. The group change operation can be blocked while the group change preparation operations are underway. The group change operation can proceed after the nodes of the group indicate completion of the group change preparation operations. Further aspects and embodiments of this disclosure are described in detail herein.

One example computing platform that can optionally incorporate the cluster group change preparation techniques disclosed herein is an ISILON OneFS® cluster provided by DELL®, Inc. It can be appreciated that OneFS® clusters are one of many optional cluster computing technologies, any of which can incorporate the teachings of this disclosure.

FIG. 1 illustrates an example cluster of computing devices, in accordance with one or more embodiments described herein. FIG. 1 includes a cluster 102 of data node devices, referred to in FIG. 1 as storage nodes 104(1), 104(2) . . . 104(M). Each storage node 104(1), 104(2) . . . 104(M) can comprise a computing device. Storage nodes 104(1), 104(2) . . . 104(M) can be configured to serve objects in response to requests from clients 108. Furthermore, typically one of the nodes 104(1), 104(2) . . . 104(M) can host a cluster controller virtual machine (not shown in FIG. 1), making that node the cluster controller node which administers the cluster 102. The nodes 104(1), 104(2) . . . 104(M) can be coupled to each other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects, e.g., up to trillions of objects or more. To this end, a node such as the node 104(2) generally comprises ports 112 by which clients 108 connect to the cluster 102. Example ports 112 are provided for requests via various protocols, including but not limited to SMB (server message block), FTP (file transfer protocol), HTTP/HTTPS (hypertext transfer protocol), and NFS (Network File System); further, SSH (secure shell) allows administration-related requests, for example.

Each node, such as the node 104(2), can include an instance of an operating system 114, e.g., a OneFS® or other operating system. Each node, such as the node 104(2), can furthermore include a CPU 122, RAM 124, and storage devices such as disks 126. RAM 124 and disks 126 can comprise, e.g., volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It should be emphasized that cluster deployments can be of any size. Depending on the needs of a particular organization, some clusters may comprise five or fewer nodes, while large clusters can comprise much larger numbers of nodes. The technologies disclosed herein can be included in clusters of any size, as can be appreciated.

Figure 2:
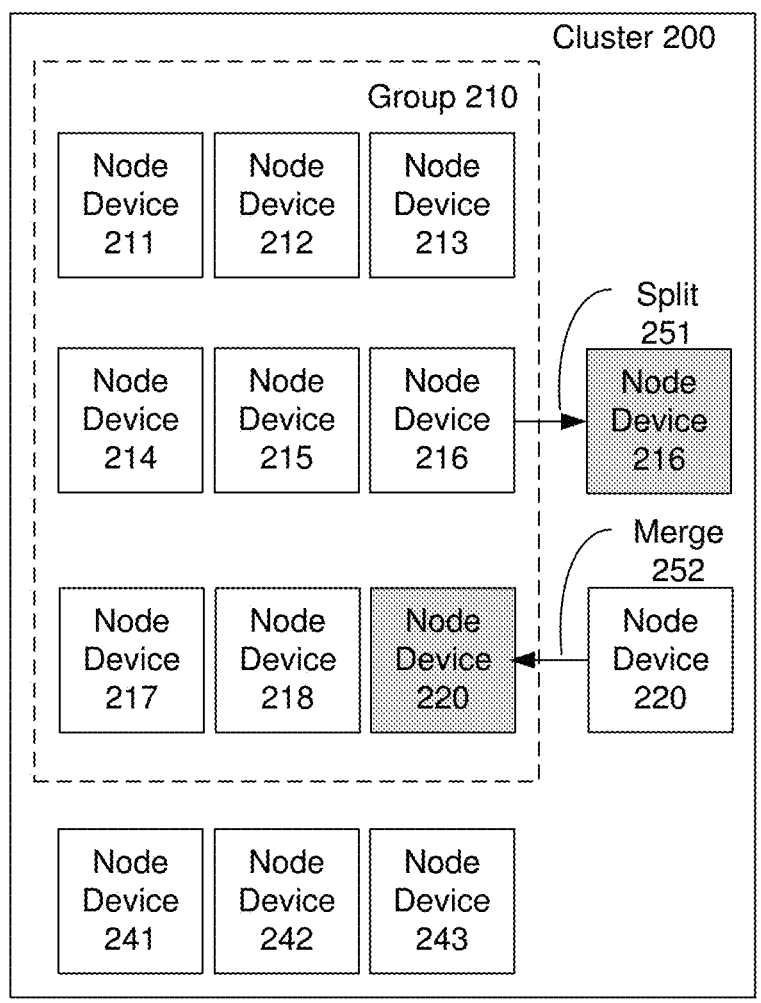
FIG. 2 illustrates example group change operations within a cluster of computing devices, in accordance with one or more embodiments described herein.

FIG. 2 illustrates example group change operations within a cluster of computing devices, in accordance with one or more embodiments described herein. FIG. 2 includes an example cluster 200. The cluster 200 includes an example group 210. Group 210 includes a subset of the node devices within the cluster 200. Group 210 includes node devices 211, 212, 213, 214, 215, 216, 217, and 218. Cluster 200 can optionally include additional groups (not illustrated in FIG. 2). Additionally, the cluster 200 comprises node devices 241, 242, 243 and 220, which are at least initially unaffiliated with the group 210. In an example, the node devices 241, 242, 243 and 220 can be provisioned to be included in cluster 200, however, the node devices 241, 242, 243 and 220 have not yet undertaken operations to join group 210. It can be appreciated that the number of node devices in cluster 200 and in the group 210 is for illustration only and a cluster can include any number of node devices and any number of groups, and the groups can also be of any size.

In an example group change operation, a merge 252 may involve a node 220 joining a group 210. Initially, the node 220 is not in the group 210. According to embodiments of this disclosure, the devices 211-218 of the group 210 can be notified in advance of the merge 252, and the nodes 211-218 of the group 210 can perform various group change preparation operations, including the lazy lock queue reduction techniques disclosed herein. After the nodes 211-218 of the group 210 complete their group change preparation operations, the merge 252 can proceed and the node 220 can be integrated into the group 210.

In another example group change operation, a split 251 may involve a node 216 leaving a group 210. Initially, the node 216 is in the group 210. According to embodiments of this disclosure, the nodes 211-218 of the group 210 can be notified in advance of the split 251, and the nodes 211-218 of the group 210 can perform various group change preparation operations, including the lazy lock queue reduction techniques disclosed herein. After the nodes 211-218 of the group 210 complete their group change preparation operations, the split 251 can proceed and the node 216 can be separated from the group 210.

Figure 3:
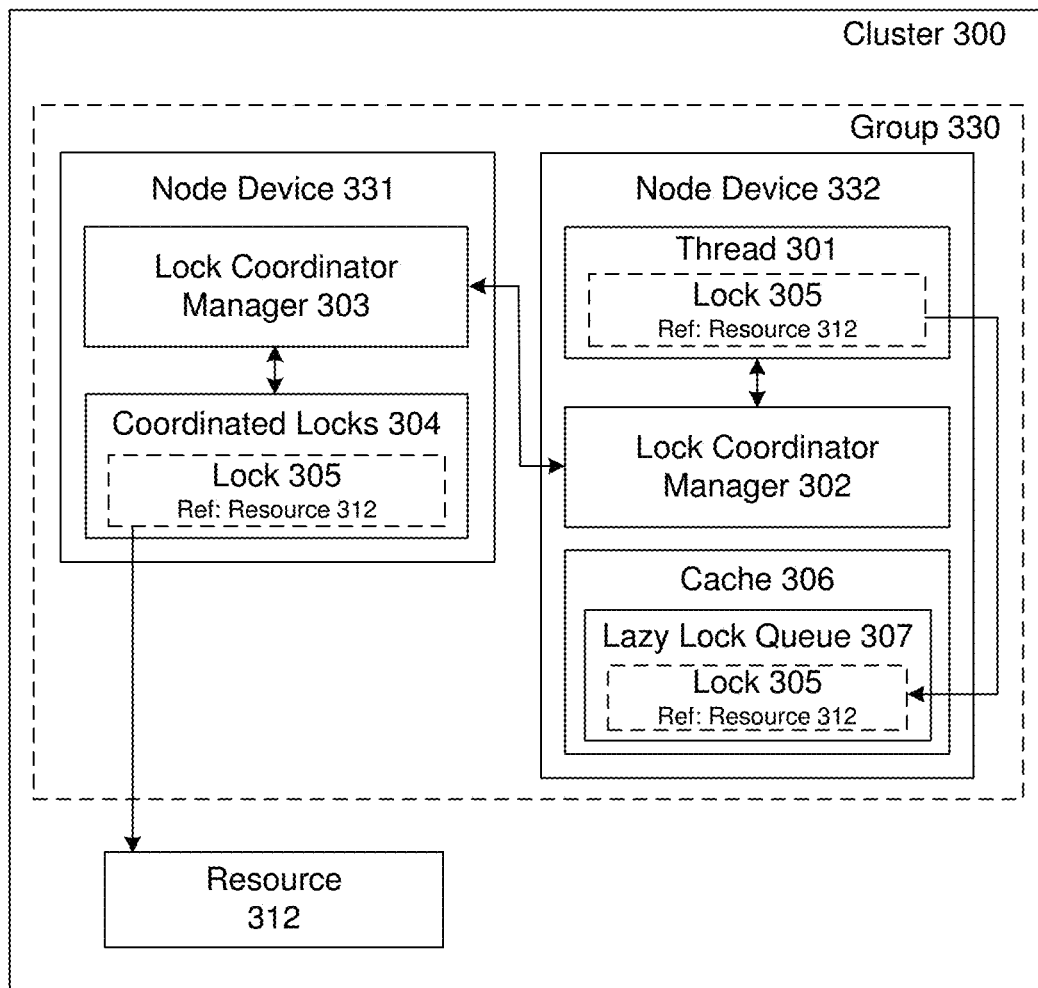
FIG. 3 illustrates an example locking architecture which may be used for locks within a group of computing devices, in accordance with one or more embodiments described herein.

FIG. 3 illustrates an example locking architecture which may be used for locks within a group of computing devices, in accordance with one or more embodiments described herein. Aspects of this disclosure relate to managing locks as a group change preparation operation. In some embodiments, managing locks can be carried out within a locking architecture such as illustrated in FIG. 3.

FIG. 3 includes an example cluster 300 comprising a group 330 as well as an example resource 312. The group 330 includes node device 331 and node device 332. Node device 331 includes lock coordinator manager 303 and coordinated locks 304, wherein coordinated locks 304 includes example lock 305. Node device 332 includes example thread 301 holding example lock 305, lock coordinator manager 302, and cache 306. Cache 306 includes lazy lock queue 307, and lock 305 can be placed in the lazy lock queue 307 as described herein.

In general, in a locking architecture such as illustrated in FIG. 3, a thread 301 at node device 332 may request a lock on a resource 312. The node device 332 can be referred to as a lock initiator. The lock coordinator manager 302 at node device 332 can determine another node device within the group 330 to serve as lock coordinator for the requested lock. In FIG. 3, the node device 331 is the determined lock coordinator. The node device 332 requests the lock from the lock coordinator manager 303 at node device 331. Assuming the lock is available, the lock coordinator manager 303 can notify the node device 332 that the lock is approved, and the lock coordinator manager 303 can record the requested lock as lock 305 in a list of coordinated locks 304. The thread 301 can then hold the lock 305. Lock 305 is illustrated as including a reference to the locked resource 312.

When thread 301 releases the lock 305, the node 332 can continue to cache the lock 305 (and thereby continues to hold the lock 305) by the lock coordinator manager 302 placing the lock 305 on the lazy lock queue 307. The lock 305 can stay on the lazy lock queue 307 until the lock 305 is used again on the node 332, another node requests a lock on the resource 312, or the lazy lock queue 307 becomes larger than its maximum size goal, resulting in a release of locks from lazy lock queue 307, back to their respective lock coordinators.

In the example locking architecture of FIG. 3, the node 331 can be referred to as a lock coordinator, and the node 332 can be referred to as a lock initiator. The lock coordinator controls locks requested and then held by the lock initiator. For a given lock, the lock coordinator can be determined by an algorithm, e.g., a function of a set of nodes in the group 330. Thus multiple different nodes in the group 330 can potentially be selected to serve as a lock coordinators for multiple different locks. For large groups, there may be many lock initiator/lock coordinator relationships between the nodes.

In such a locking architecture, when a node joins or leaves the group 330, the lock coordinators are recalculated, resulting in moving lock coordinators for some of the locks to new nodes. Adjusting the lock coordinators during group merge or split operations is referred to herein as a lock renegotiation protocol.

One cause of data unavailability at computing clusters is work involved in the lock renegotiation protocol for group change operations such as merges and splits. Updating the state of all the lock initiators whose lock coordinators are affected by a group change can entail significant processing. During a merge, lock initiator threads can be blocked while such lock processing occurs. During a split, lock initiator threads are effectively blocked because the group 330 is essentially deadlocked until the split has completed and the locks held by down nodes are released. The period of time that it takes to complete the lock renegotiation protocol increases with the number of locks held in the group 330, including those held at lazy lock queues at each node.

Therefore, in some embodiments, group change preparation operations according to this disclosure can include operations to reduce the size of lazy lock queues, such as lazy lock queue 307, at some or all of the nodes within a group. The disclosed lazy lock queue reduction techniques can optionally be performed along with any other desired group change preparation operations, which can include for example any operation conducted prior to a group change operation itself for the purpose of making the group change operation faster and/or more efficient.

Figure 4:
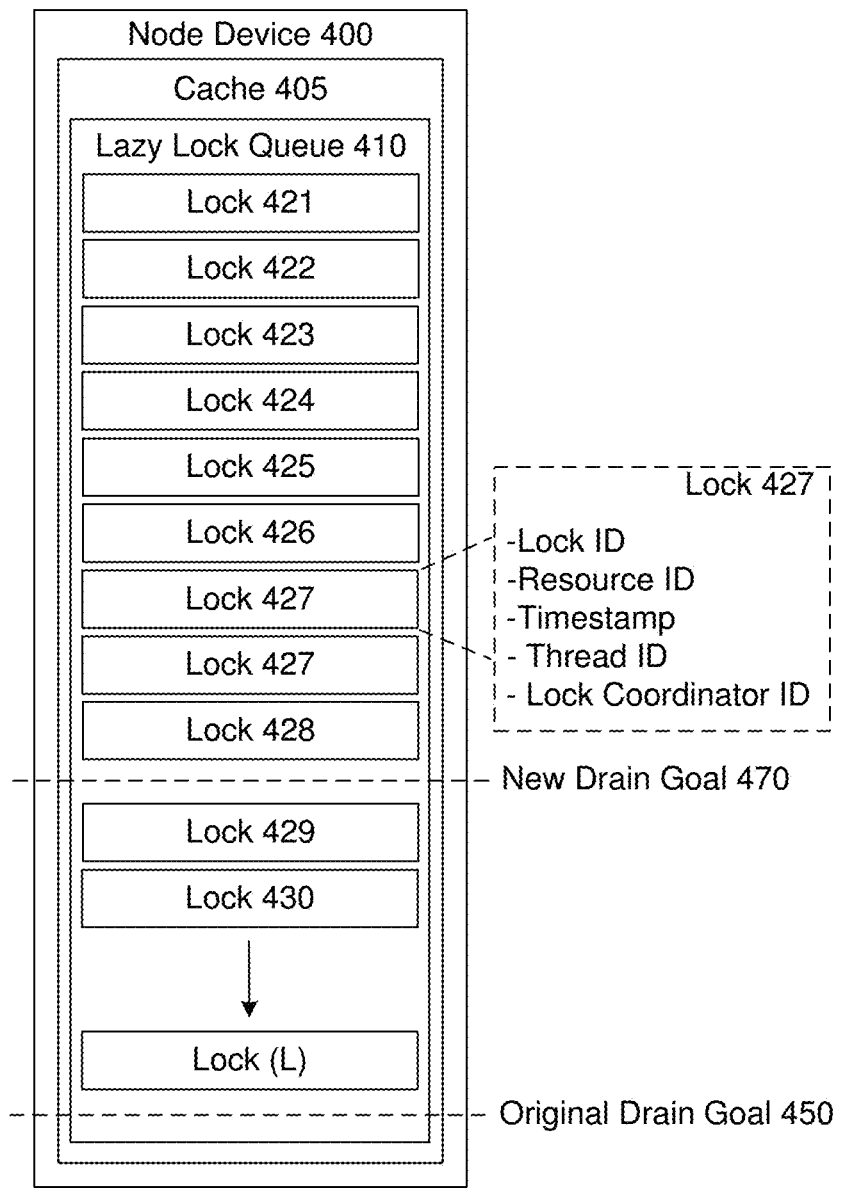
FIG. 4 illustrates an example cache comprising a lazy lock queue, in accordance with one or more embodiments described herein.

FIG. 4 illustrates an example cache comprising a lazy lock queue, in accordance with one or more embodiments described herein. The example cache 405 is at a node device 400. Node device 400 can implement a node device such as 332 introduced in FIG. 3. In this regard, the cache 405 can implement the cache 306, and the lazy lock queue 410 can implement lazy lock queue 307. Lazy lock queue 410 comprises multiple example lock entries 421, 422, 423, 424, 425, 426, 427, 428, 429, 430 . . . (L).

Each lock entry 421, 422, 423, 424, 425, 426, 427, 428, 429, 430 . . . (L) can comprise a variety of data. For example, representative lock entry 427 includes a lock ID, a resource ID, a timestamp, a thread ID, and a lock coordinator ID. The lock ID can provide a unique identifier for the lock 427. The resource ID can identify a resource held by the lock 427. The timestamp can define a time associated with the lock 427, e.g., a time at which the lock 427 was approved by a lock coordinator, or a time at which the lock 427 was placed on the lazy lock queue 410. The thread ID can identify a thread that requested the lock 427. The lock coordinator ID can identify a lock coordinator associated with the lock 427. Additional or reduced data can be included in lock entries in other embodiments.

Under ordinary conditions, with no planned group change operation, a total allowed number of lock entries in lazy lock queue 410 can be either undefined (no limit), or defined by original drain goal 450. In an implementation, original drain goal 450 can comprise, e.g., millions or even tens of millions of lock entries. If the original drain goal 450 is reached, processes at node device 400 can remove lock entries from the lazy lock queue 410 in order to keep the number of lock entries in lazy lock queue 410 at or below the original drain goal 450.

A group change preparation operation according to this disclosure can comprise modifying original drain goal 450 to establish a new drain goal 470 for the lazy lock queue 410. In an implementation, new drain goal 470 can comprise, e.g., tens of thousands or hundreds of thousands of lock entries. After new drain goal 470 is set, processes at node device 400 can remove lock entries from the lazy lock queue 410 in order to keep the number of lock entries in lazy lock queue 410 at or below the new drain goal 470.

Also, in an embodiment, node device 400 can remove lock entries from lazy lock queue 410 based at least on part on age of the lock entries. One example process at node device 400 can define an allowed age for lock entries in lazy lock queue 410. An age of a lock entry, e.g., lock 421, can be determined by calculating a difference between a current time and a timestamp for lock 421. If the determined age is greater than the allowed age, the lock 421 can be removed from lazy lock queue 410, and an age of a next lock entry 422 can be determined. The process can continue removing lock entries until a lock entry is found to have an age that is not greater than the allowed age. Using this approach, checking the ages of all lock entries in the lazy lock queue 410 is not necessary to perform expiration based cleanup of the lazy lock queue 410.

A group change preparation operation according to this disclosure can comprise either establishing or modifying the allowed age or age limit for lock entries in the lazy lock queue 410. After a new allowed age is set, processes at node device 400 can remove lock entries from the lazy lock queue 410 in order to comply with the new allowed age.

In some embodiments, removing lock entries from lazy lock queue 410 can comprise a task performed by any thread at node device 400. For example, each time a thread releases a lock, the thread can check the lazy lock queue 410 to determine if work is needed to remove lock entries therefrom, and the thread can perform such lazy lock queue 410 cleanup work as needed. In an embodiment, in the event that a new drain goal or new allowed age triggers a large amount of lazy lock queue 410 cleanup work, a thread can opt out of such work and a new thread can be initiated for lazy lock queue 410 cleanup work, e.g., as discussed further in connection with FIG. 6.

Figure 5:
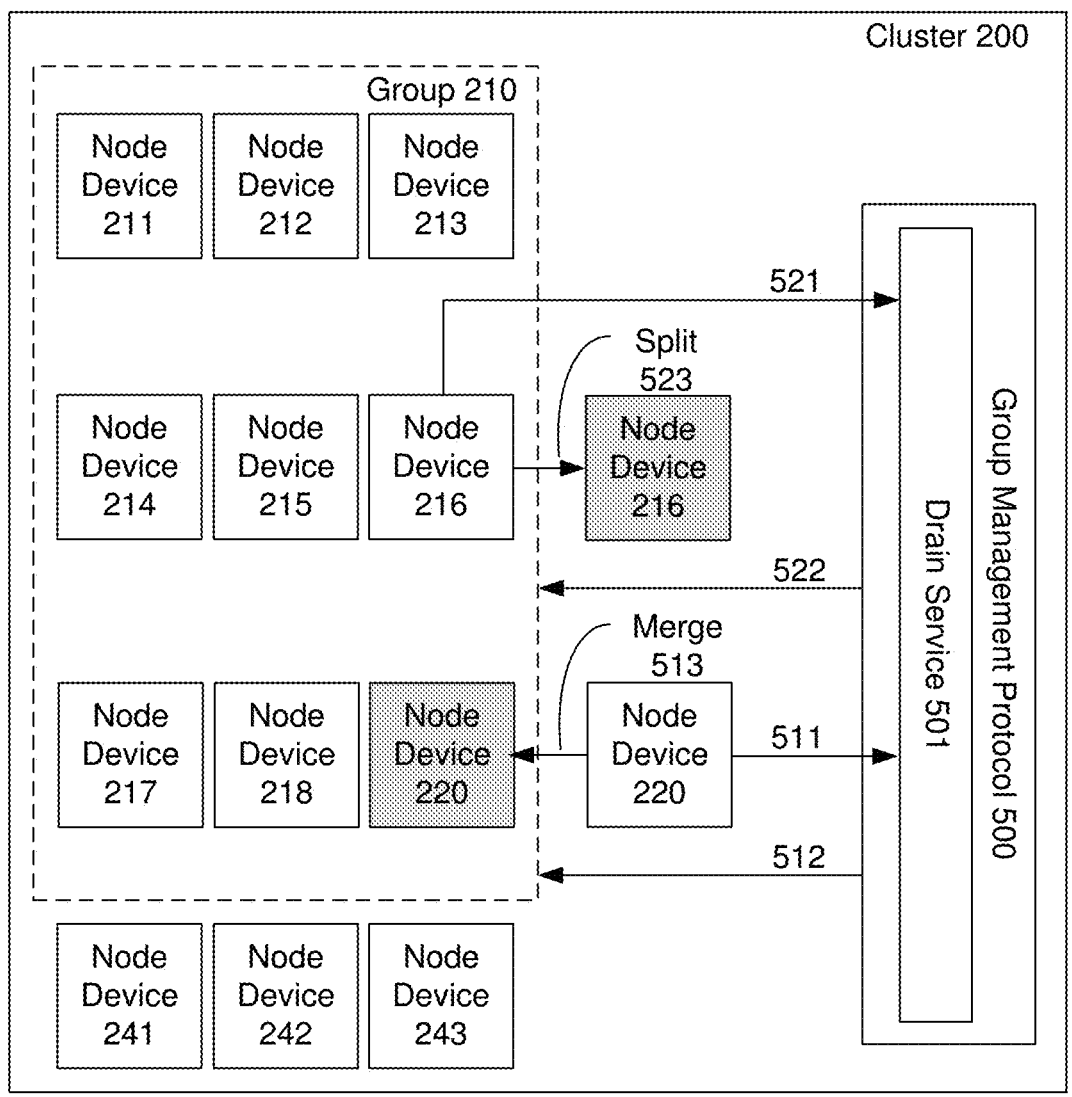
FIG. 5 illustrates example communications to prepare for group change operations, in accordance with one or more embodiments described herein.

In an aspect, a lazy lock queue 410 represents locks held by the node device 400 but no longer actively used. Lock entries in the lazy lock queue 410 are cached because there is some likelihood the node device 400 may use the locks again. When setting new drain goal 470, a non-zero number of lock entries can be selected so that some caching can be allowed until the node device 400 actually splits or merges. In some embodiments, whenever a drain service, such as described in connection with FIG. 5, is active, the lazy lock queue 410 drain goal can be changed to the new drain goal 470. Further, to ensure locks are not held on the lazy lock queue 410 indefinitely, a time limit that a lock can be held on the lazy lock queue 410 can be introduced. The time limit can optionally be applied regardless of whether a group change operation is planned, however, the time limit can be shortened as a group change preparation. After this time limit has expired, a lock can removed from the lazy lock queue 410, e.g., the lock can be returned to its lock coordinator.

While cache 405 and lazy lock queue 410 are illustrated within node device 400, it can be appreciated by those of skill in computing that architectures are possible wherein cache 405 and lazy lock queue 410 are not within node device 400. For example, cache 405 and lazy lock queue 410 can optionally comprise a shared cache and shared lazy lock queue, shared by multiple node devices in a group.

FIG. 5 illustrates example communications to prepare for group change operations, in accordance with one or more embodiments described herein. FIG. 5 illustrates the cluster 200 introduced in FIG. 2, including the various node devices introduced in FIG. 2. FIG. 5 furthermore includes a group management protocol 500 implemented in cluster 200, wherein the group management protocol 500 includes a drain service 501. The drain service 501 is one example mechanism to manage communications to prepare for group change operations, and those of skill in the art can appreciate that other approaches can be used.

FIG. 5 illustrates a merge operation 513 along with communications to prepare for the merge operation 513. Node device 220 can send a notification 511 to drain service 501, in advance of the merge operation 513. Drain service 501 can notify 512 at least the node devices 211-218 of the group 210 associated with the planned merge operation 513. Drain service 501 can also optionally notify other node devices in the cluster 200. In response to the notification 512, the node devices 211-218 of the group 210 can perform group change preparation operations, e.g., the group change preparation operations described in connection with FIG. 4. When the group change preparation operations are complete, the merge operation 513 can proceed.

In an embodiment, the node devices 211-218 of the group 210 can each raise a "merge blocked" flag, which can entail a communication to drain service 501, while the node devices 211-218 of the group 210 are conducting group change preparation operations. The node devices 211-218 of the group 210 can each lower or release their "merge blocked" flags when their respective group change preparation operations are completed. Lowering their "merge blocked" flags can optionally entail a communication to drain service 501. This can ensure that node devices 211-218 of the group 210 have completed their respective group change preparation operations prior to initiating merge operation 513.

FIG. 5 furthermore illustrates a split operation 523 along with communications to prepare for the split operation 523. Node device 216 can send a notification 521 to drain service 501, in advance of the split operation 523. Drain service 501 can notify 522 at least the node devices 211-218 of the group 210 of the planned split operation 523. Drain service 501 can also optionally notify other node devices in the cluster 200. In response to the notification 522, the node devices 211-218 of the group 210 can perform group change preparation operations, e.g., the group change preparation operations described in connection with FIG. 4. When the group change preparation operations are complete, the split operation 523 can proceed.

In an embodiment, the node devices 211-218 of the group 210 can each block optional processes that would cause a split, which can entail a communication to drain service 501, while the node devices 211-218 of the group 210 are conducting group change preparation operations. The node devices 211-218 of the group 210 can each release such blocks of processes that would cause a split when their respective group change preparation operations are completed. The release of such blocks can optionally entail a communication to drain service 501. This can ensure that node devices 211-218 of the group 210 have completed their respective group change preparation operations prior to initiating split operation 523.

In some embodiments, a time limit can be set for completion of group change preparation operations, and the group change operations 513, 523 can proceed after the time limit is reached, regardless of whether group change preparation operations are complete. In some embodiments, a time limit may be applied in connection with some group change operations, e.g., splits, and not other group change operations, e.g., merges.

In an example embodiment according to FIG. 5, the use of a drain service 501 can reduce the data unavailable period, also referred to herein as a "critical period" during a merge 513 or a split 523. Cluster 200 can comprise a set of nodes logically joined together as a one or more group management protocol (GMP) groups. A group change operation can comprise a coherent way of changing cluster-wide shared state. A merge 513 is a group change operation for adding nodes to a GMP group 210, while a split 523 is a group change operation to remove nodes from a GMP group 210.

In order to synchronize nodes during a merge 513, a shared merge lock can be held by the each node 211-218 of the group 210 during the merge 513. This represents the critical period during a GMP merge operation 513, because the nodes 211-218 of the group 210 are blocked from doing any other GMP function. Likewise, during a GMP split 523, the locks at a group 210 or cluster 200 as a whole can be effectively deadlocked until the split 523 has completed.

The techniques of this disclosure reduce the time that a split 523 or merge 513 takes by moving tasks to before the split or merge operation begins. This is accomplished by configuring nodes, such as node devices 211-218, to advertise their intent to split or merge, and having the nodes in the cluster 200 react to advertised intent. This allows critical periods of split and merge operations to complete faster.

In an implementation, the drain service 501 can comprise a GMP 500 service. The shutdown user command can be modified at nodes, e.g., at node device 216, to use the drain service 501 to warn the nodes in a current group 210 that a particular node 216 is about to be brought down. Likewise, GMP merges can be modified by introducing a mechanism, such as drain service 501, which delays a merge operation 513 until after group change preparation operations can be completed. This moves the lock renegotiation protocol overhead to before the critical period.

In a further aspect, the drain service 501 can be added to the GMP 500, and the GMP 500 can be modified so that it is notified when at least one node has the drain service 501 up. When a split 523 is planned, e.g., via a shutdown command on any node, the node can activate the drain service 501. The drain service 501 can notify other nodes that the drain service 501 is active. Then the group 210 can wait until group change preparation operations are complete, e.g., until a new drain goal is met on nodes, or alternatively, the group 210 can wait until elapse of a time interval such as 60 seconds, before allowing the split 523 to proceed. Of course, unplanned splits, due to unplanned power off or unplanned failure of a node, will necessarily proceed without activating the drain service 501, meaning that some split processes can take place without the benefit of the techniques disclosed herein.

With regard to merges, in some embodiments, a GMP merge blocked mechanism can be used to prevent merges when group change preparation operations remain incomplete, e.g. when a size of a lazy lock queue for a node within group 210 is above a new drain goal. A GMP "should merge" algorithm can be used to decide if a merge 513 can proceed. If so, then the group 210 can initiate group change preparation operations, e.g., by draining at least one lazy lock queue for at least one node of the group 210. Nodes in the group 210 can have the same information so can make the same decision to start draining lazy lock queues or performing other group change preparation operations. After a period of time for the group change preparation options to complete, the GMP merge blocked flag(s) can be released. This allows the merge 513 to commence.

Figure 6:
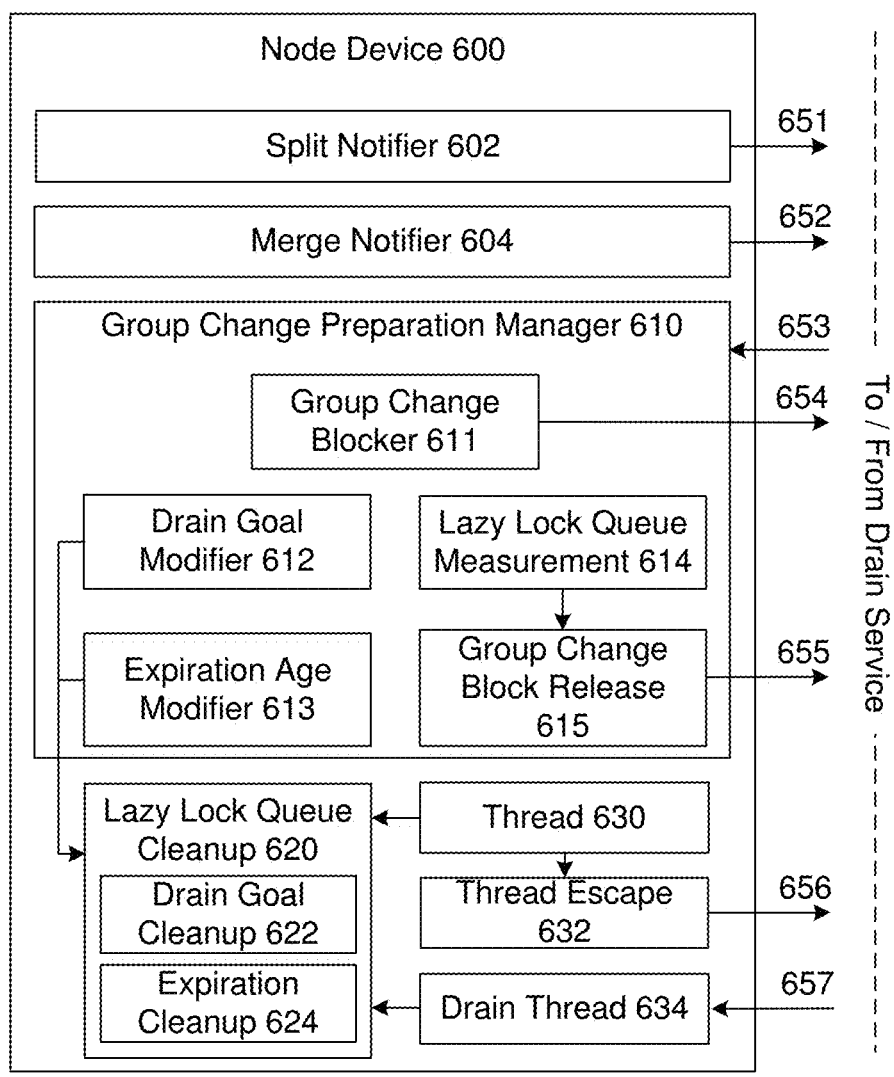
FIG. 6 illustrates an example node device, in accordance with one or more embodiments described herein.

FIG. 6 illustrates an example node device, in accordance with one or more embodiments described herein. Example node device 600 can implement any of the various node devices discussed herein. Node device 600 can comprise, for example, a split notifier 602 and a merge notifier 604. Node device 600 can further comprise a group change preparation manager 610. Group change preparation manager 610 can include a group change blocker 611, a drain goal modifier 612, an expiration age modifier 613, a lazy lock queue measurement 614, and a group change block release 615. Node device 600 can further comprise a lazy lock queue cleanup 620, which comprises a drain goal cleanup 622 and an expiration cleanup 624. Node device 600 can further comprise a thread 630, a thread escape 632, and a drain thread 634. It can be appreciated that while FIG. 6 illustrates various components of an example node device 600, those of skill in the art can develop other components and architectures to implement this disclosure.

In an example according to FIG. 6, the split notifier 602 can be configured to notify 651 other nodes of a planned split of node 600 from a group comprising node 600. For example, in response to receiving a shutdown command at node 600, split notifier 602 can be activated to notify 651 other nodes of a planned split. In an embodiment, the notification 651 to other nodes can comprise a notification 651 to a drain service 501 illustrated in FIG. 5, wherein the drain service 501 can be responsible for notifying other nodes. The notification 651 to other nodes can optionally comprise a notification to other nodes in a cluster comprising node 600, or a notification to other nodes in a group comprising node 600.

The merge notifier 604 can be configured to notify 652 other nodes of a planned merge of node 600 into a group of other nodes. For example, in response to a merge determination by node 600, or a merge command received at node 600, the merge notifier 604 can be activated to notify 652 other nodes of a planned merge. The notification 652 to other nodes can comprise a notification 652 to a drain service 501 illustrated in FIG. 5, wherein the drain service 501 can be responsible for notifying other nodes. The notification 652 to other nodes can optionally comprise a notification to other nodes in a cluster comprising node 600, or a notification to other nodes in a group into which 600 is to merge.

Group change preparation manager 610 can be configured to manage group change preparation operations at node device 600. Group change preparation manager 610 can initiate group change preparation operations in response to a notification 653 of a planned group change which affects a group in which node 600 participates. Notification 653 can comprise, e.g., a notification from a drain service 501 illustrated in FIG. 5. Group change preparation manager 610 can also optionally initiate group change preparation operations in response to a determination at node device 600 that node device 600 itself is to merge or split from a group of other node devices.

Group change blocker 611 can optionally raise a block flag, e.g., by sending a notification 654 to a drain service 501 illustrated in FIG. 5. The block flag can be operable to prevent the planned group change from proceeding, until node device 600 has completed its group change preparation operation(s).

Group change preparation manager 610 can initiate group change preparation operations at node device 600, e.g., via drain goal modifier 612 and/or via expiration age modifier 613. The drain goal modifier 612 can establish or modify a drain goal at node device, in order to reduce the size of a lazy lock queue at node device 600 as described herein. The expiration age modifier 613 can establish or shorten an expiration age for lazy lock queue entries, as another approach to reduce the size of a lazy lock queue at node device 600 as described herein. The work of reducing the lazy lock queue pursuant to the modified drain goal or shortened expiration age can optionally be performed by thread 630 and/or drain thread 634, as will be described further herein.

Group change preparation manager 610 can monitor progress of group change preparation operations at node device 600. For example, lazy lock queue measurement 614 can monitor a size of a lazy lock queue. When the lazy lock queue reaches, e.g., the modified drain goal set by drain goal modifier 612, lazy lock queue measurement 614 can be configured to notify group change block release 615. Group change block release 615 can release the block flag raised by group change blocker 611. The block flag can be released, e.g., by sending a notification 655 to the drain service 501 illustrated in FIG. 5.

As noted herein, the work of reducing a lazy lock queue can be performed by thread 630, wherein thread 630 can be any thread that executes at node device 600. Thread 630 can be configured to perform routine lazy lock queue cleanup operations, e.g., as a routine performed each time thread 630 releases a lock. To perform the lazy lock queue cleanup operations, thread 630 can call lazy lock queue cleanup 620. Lazy lock queue cleanup 620 can comprise drain goal cleanup 622, which removes entries from a lazy lock queue in order to meet a drain goal established at node device 600, e.g., the modified drain goal set by drain goal modifier 612. Lazy lock queue cleanup 620 can also comprise expiration cleanup 624, which can remove entries from a lazy lock queue in order to meet an expiration age at node device 600, e.g., the modified expiration age set by expiration age modifier 613.

In some embodiments, removing an entry from a lazy lock queue can comprise contacting the lock coordinator to release the lock. Further operations to remove a lazy lock queue entry can include so called "lock loss call back" operations, as well as, for example, saving data for a locked resource to disk.

In a further optional embodiment, a thread escape 632 can allow thread 630 to escape from performing a large amount of lazy lock queue reduction work. In an embodiment, when thread 630 has performed a threshold amount of lazy lock queue reduction, thread 630 can call thread escape 632 to release thread 630 from further lazy lock queue reduction operations. Thread escape 632 can optionally notify a drain service via notification 656, and the drain service can initiate a drain thread 634 via a command 657. The drain thread 634 can take over lazy lock queue reduction operations at node device 600.

Figure 7:
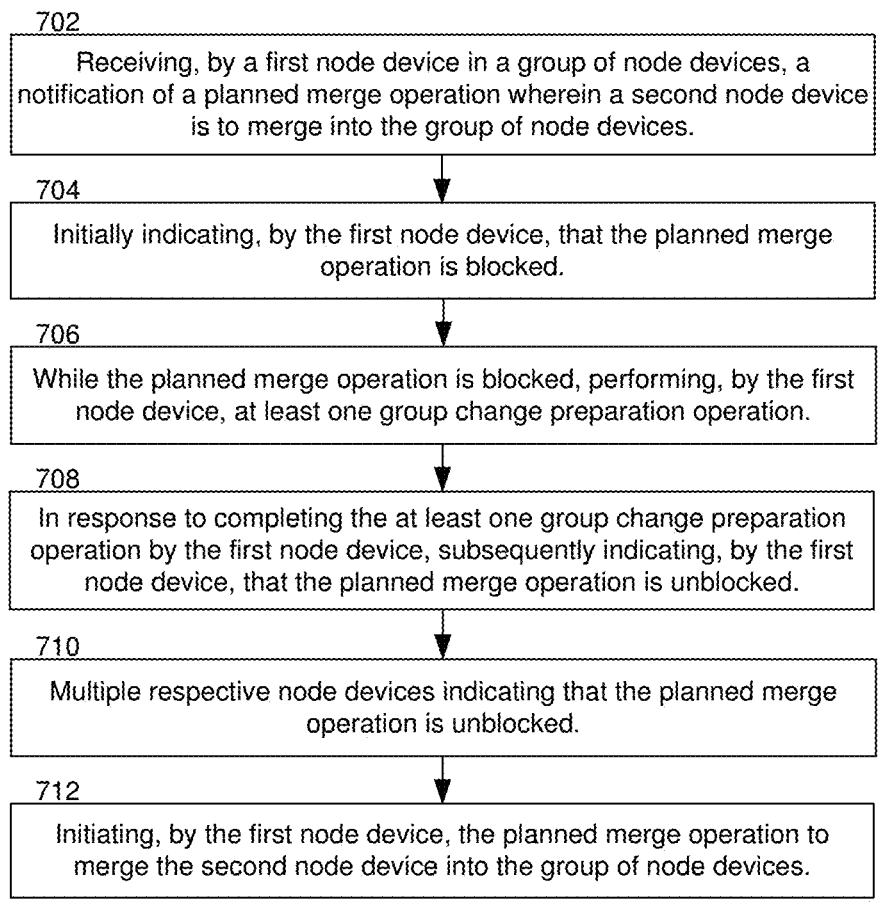
FIG. 7 is a flow diagram of an example, non-limiting computer implemented method to prepare for a cluster merge operation in order to increase efficiency thereof, in accordance with one or more embodiments described herein.

FIG. 7 is a flow diagram of an example, non-limiting computer implemented method to prepare for a cluster merge operation in order to increase efficiency thereof, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by a node device, such as node device 218 in FIG. 2 and FIG. 5, which can be referred to as a "first node device". The first node device 218 can prepare for merge of a second node device 220 into the group 210.

At 702, the first node device 218 can receive a notification 512 of a planned merge operation wherein the second node device 220 is to merge into the group of node devices 210. The first node device 218, the second node device 220, and the group of node devices 210 are in a cluster 200 of node devices the group of node devices 210. In an example implementation, the notification 512 of the planned merge operation can be performed according to a drain service 501 of a group management protocol 500.

At 704, the first node device 218 can initially indicate that the planned merge operation 513 is blocked. The other node devices in the group 210 can also indicate that the merge operation 513 is blocked. At 706, while the planned merge operation 513 is blocked, the first node device 218 can perform at least one group change preparation operation. The other node devices in the group 210 can also perform group change preparation operations. An example group change preparation operation for first node device 218 includes, e.g., draining a cached lazy lock queue at the first node device 218, wherein the cached lazy lock queue comprises a cached queue of locks held for the first node device 218.

At 708, in response to completing the at least one group change preparation operation by the first node device 218, the first node device 218 can subsequently indicate that the planned merge operation 513 is unblocked. Multiple respective node devices within the group of node devices 210, e.g., first node device 218 as well as node devices 211-217, can also indicate that the planned merge operation 513 is unblocked in response to completing respective group change preparation operations at the multiple respective node devices 211-218.

At 710, the first node device 218, as well as the other node devices in the group 210 and the second node device 220, can initiate the planned merge operation 513 to merge the second node device 220 into the group of node devices 210. The initiating the planned merge operation 513 to merge the second node device 220 into the group of node devices 210 can commence in response to the multiple respective node devices of the group 210 indicating that the planned merge operation 513 is unblocked. One part of the planned merge operation 513 to merge the second node device 220 into the group of node devices 210 can comprise reselecting, by the first node device 218, one or more other node devices in the group of node devices 210, other than the first node device 218, to serve as lock coordinators for the locks held for the first node device 218.

Figure 8:
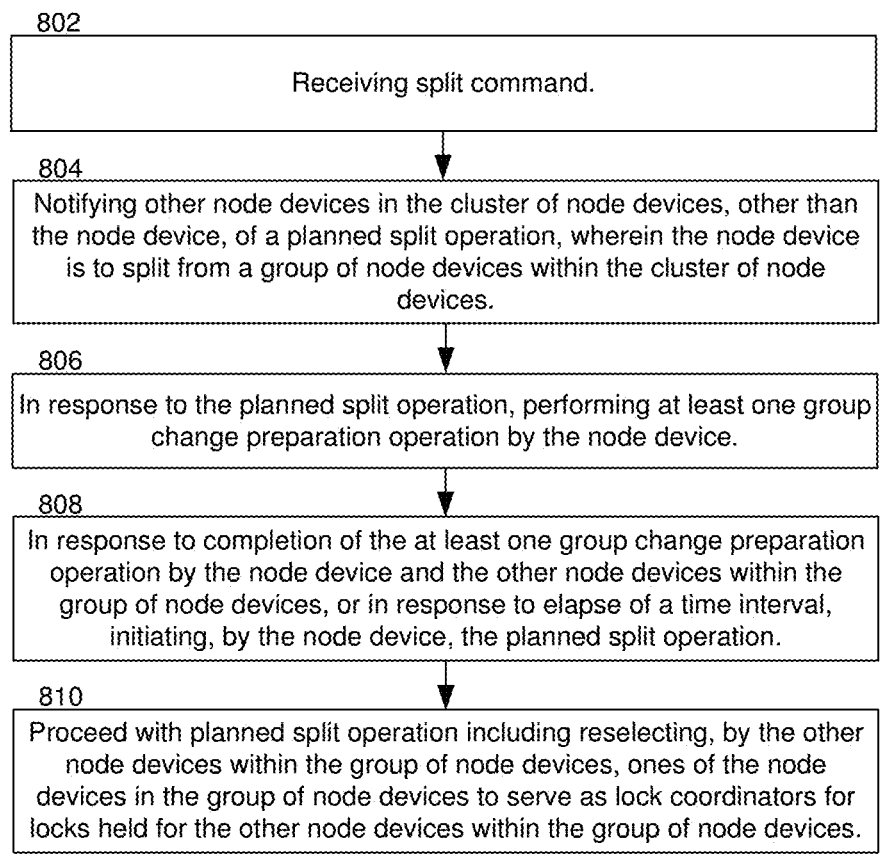
FIG. 8 is a flow diagram of an example, non-limiting computer implemented method to prepare for a cluster split operation in order to increase efficiency thereof, in accordance with one or more embodiments described herein.

FIG. 8 is a flow diagram of an example, non-limiting computer implemented method to prepare for a cluster split operation in order to increase efficiency thereof, in accordance with one or more embodiments described herein. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by a node device 216 as illustrated in FIG. 2 and FIG. 5. At 802, the node device 216 can receive a split command. Any command that entails splitting node device 216 from group 210 can be considered a split command. For example, a shutdown command is one example split command.

At 804, the node device 216 can notify 521 other node devices 211-215 and 217-218 in the cluster of node devices 200, other than the node device 216, of a planned split operation 523, wherein the node device 216 is to split from a group of node devices 210 within the cluster of node devices 200. The notifying the other node devices 211-215 and 217-218 in the cluster of node devices 220 of the planned split operation 523 can be performed in response to a shutdown command or other split command received at the node device 216 at block 802. In some embodiments, the full cluster 200 can be notified of the planned split operation 523, while in other embodiments, the notification can be limited to a group 210. In either case, the notifying the other node devices such as 211-215 and 217-218 in the cluster of node devices 200 of the planned split operation 523 can optionally be performed according to a drain service 501 of a group management protocol 500.

At 806, in response to the planned split operation 523, the node device 216 can perform at least one group change preparation operation. Similarly, respective node devices 211-215 and 217-218 within the group of node devices 210 can perform respective group change preparation operations at the respective node devices 211-215 and 217-218, in response to receiving a notification 522 of the planned split operation 523. The group change preparation operation performed at the node device 216 can comprise, e.g., draining a cached lazy lock queue at the node device 216, wherein the cached lazy lock queue comprises a cached queue of locks held for the node device 216.

At 808, in response to completion of the at least one group change preparation operation by the node device 216 and the other node devices 211-215 and 217-218 within the group of node devices 210, or in response to elapse of a time interval, the node device 216 can initiate the planned split operation 523. Initiating the planned split operation 523 can commence after each respective node device 211-215 and 217-218 of the other node devices within the group of node devices 220 has completed a respective group change preparation operation.

At 810, the group 210 can proceed with the split operation 523. The planned split operation to split the node device 216 from the group of node devices 210 can comprise reselecting, by the other node devices 211-215 and 217-218 within the group of node devices 210, ones of the node devices 211-215 and 217-218 in the group of node devices 210 to serve as lock coordinators for locks held for the other node devices 211-215 and 217-218 within the group of node devices 210.

Figure 9:
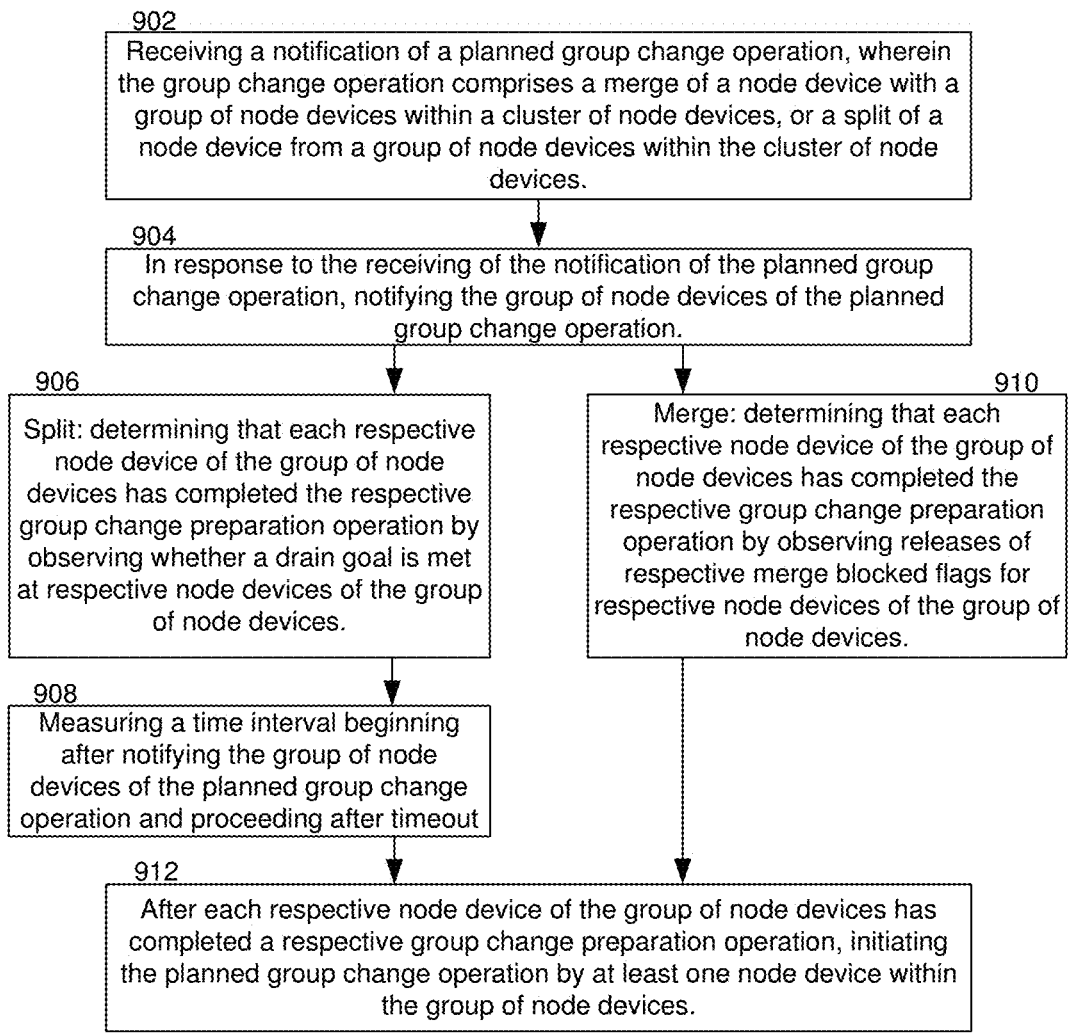
FIG. 9 is a flow diagram of an example, non-limiting computer implemented method which can be performed by a cluster drain service, in accordance with one or more embodiments described herein.

FIG. 9 is a flow diagram of an example, non-limiting computer implemented method which can be performed by a cluster drain service, in accordance with one or more embodiments described herein. The blocks of the illustrated method represent operations according to a method, components in a computing device, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a drain service 501 as illustrated in FIG. 5. As such, any of the illustrated node devices in cluster 200, or any combination thereof, can perform the method illustrated in FIG. 9. At 902, drain service 501 can receive a notification, such as 511 or 521, of a planned group change operation, wherein the group change operation comprises a merge 513 of a node device 220 with a group of node devices 210 within a cluster of node devices 200, or a split 523 of a node device 216 from a group of node devices 210 within the cluster of node devices 200.

At 904, in response to the receiving of the notification 511 or 521 of the planned group change operation 513 or 523, the drain service 501 can notify 512 or 522 the group of node devices 210 of the planned group change operation 513 or 523. In response to the notification 512 or 522, the node devices of the affected group 210 can perform group change preparation operations, e.g., draining cached lazy lock queues at respective node devices of group 210, wherein the cached lazy lock queues comprise cached queues of locks held for respective node devices within group 210. Depending on whether the planned group change operation is a merge 513 or a split 523, the method may proceed with operation 906 or operation 910.

At 906, when the planned group change operation comprises a split 523 of the node device 216 from the group of node devices 210 within the cluster of node devices 200, the drain service 501 can determine that each respective node device of the group of node devices 210 has completed the respective group change preparation operation, e.g., by observing whether a drain goal is met at respective node devices 211-218 of the group of node devices 210, as may be indicated for example by a notification from node devices 211-218. Alternatively, at 908, the drain service 501 can measure a time interval beginning after notifying 522 the group of node devices 210 of the planned group change operation 523, and the drain service 501 can proceed with the split 523 after the measured time interval exceeds a timeout interval.

When the planned group change operation comprises the merge 513 of the node device 220 with the group of node devices 210 within the cluster of node devices 200, at 910, the drain service 501 can determine that each respective node device 211-218 of the group of node devices 210 has completed a respective group change preparation operation, e.g., by observing releases of respective merge blocked flags for respective node devices 211-218 of the group of node devices 210.

At 912, after each respective node device of the group of node devices 210 has completed a respective group change preparation operation, the drain service 501 can initiate the planned group change operation 513 or 523 by at least one node device, e.g., 216 or 220, or by all node devices 211-218 within the affected group of node devices 210. The merge 513 or split 523 can then proceed with improved efficiency, and in particular, with a reduced critical period.

Figure 10:
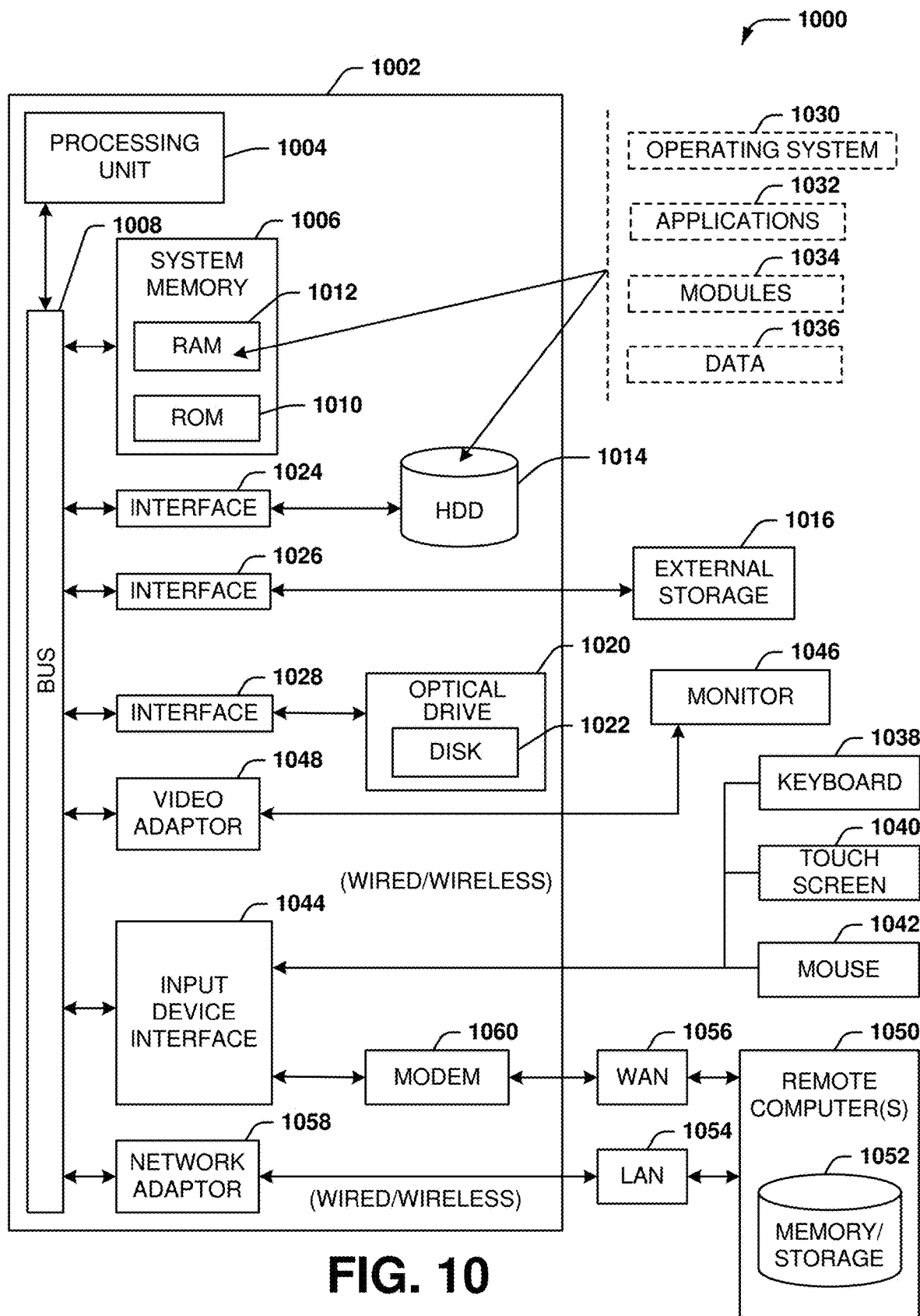
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a first node device in a group of node devices, a notification of a planned merge operation wherein a second node device is to merge into the group of node devices;
    initially indicating, by the first node device, that the planned merge operation is blocked;
    while the planned merge operation is blocked, performing, by the first node device, at least one group change preparation operation, wherein the at least one group change preparation operation comprises draining a cached lazy lock queue;
    in response to completing the at least one group change preparation operation by the first node device, subsequently indicating, by the first node device, that the planned merge operation is unblocked; and
    initiating, by the first node device, the planned merge operation to merge the second node device into the group of node devices.

2. The method of claim 1, wherein the first node device, the second node device, and the group of node devices are in a cluster of node devices.

3. The method of claim 1, wherein at least the notification of the planned merge operation is performed according to a drain service of a group management protocol.

4. The method of claim 1, wherein multiple respective node devices within the group of node devices indicate that the planned merge operation is unblocked in response to completing respective group change preparation operations at the multiple respective node devices.

5. The method of claim 4, wherein the initiating the planned merge operation to merge the second node device into the group of node devices commences in response to the multiple respective node devices indicating that the planned merge operation is unblocked.

6. The method of claim 1, wherein the cached lazy lock queue comprises a cached queue of locks held for the first node device.

7. The method of claim 6, wherein the planned merge operation to merge the second node device into the group of node devices comprises reselecting, by the first node device, one or more other node devices in the group of node devices, other than the first node device, to serve as lock coordinators for the locks held for the first node device.

8. A node device in a cluster of node devices, comprising:
at least one processor; and
at least one memory that stores executable instructions that, when executed by the at least one processor, facilitate performance of operations, comprising:
notifying other node devices in the cluster of node devices, other than the node device, of a planned split operation, wherein the node device is to split from a group of node devices within the cluster of node devices;
in response to the planned split operation, performing at least one group change preparation operation by the node device, wherein the at least one group change preparation operation comprises draining a cached lazy lock queue; and
in response to completion of the at least one group change preparation operation by the node device and the other node devices within the group of node devices, or in response to elapse of a time interval, initiating, by the node device, the planned split operation.

9. The node device of claim 8, wherein the notifying the other node devices in the cluster of node devices of the planned split operation is performed in response to a shutdown command received at the node device.

10. The node device of claim 8, wherein at least the notifying the other node devices in the cluster of node devices of the planned split operation is performed according to a drain service of a group management protocol.

11. The node device of claim 8, wherein a respective node device within the group of node devices performs a respective group change preparation operation at the respective node device, in response to receiving a notification of the planned split operation.

12. The node device of claim 8, wherein the cached lazy lock queue comprises a cached queue of locks held for the node device.

13. The node device of claim 8, wherein the initiating the planned split operation commences after each respective node device of the other node devices within the group of node devices has completed a respective group change preparation operation.

14. The node device of claim 8, wherein the planned split operation to split the node device from the group of node devices comprises reselecting, by the other node devices within the group of node devices, ones of the node devices in the group of node devices to serve as lock coordinators for locks held for the other node devices within the group of node devices.

15. A non-transitory machine-readable medium, comprising executable instructions that, when executed by a processor, facilitate performance of operations, comprising:
receiving a notification of a planned group change operation, wherein the group change operation comprises a merge of a node device with a group of node devices within a cluster of node devices, or a split of the node device from the group of node devices within the cluster of node devices;
in response to the receiving of the notification of the planned group change operation, notifying the group of node devices of the planned group change operation; and
after each respective node device of the group of node devices has completed a respective group change preparation operation, initiating the planned group change operation by at least one node device within the group of node devices,
wherein at least one respective group change preparation operation completed by a respective node device of the group of node devices comprises draining a cached lazy lock queue.

16. The non-transitory machine-readable medium of claim 15, wherein the notification of the planned group change operation is performed according to a drain service of a group management protocol.

17. The non-transitory machine-readable medium of claim 15, wherein the cached lazy lock queue comprises a cached queue of locks held for the respective node device.

18. The non-transitory machine-readable medium of claim 15, wherein the planned group change operation comprises the merge of the node device with the group of node devices within the cluster of node devices, and wherein the operations further comprise determining that each respective node device of the group of node devices has completed the respective group change preparation operation by observing releases of respective merge blocked flags for respective node devices of the group of node devices.

19. The non-transitory machine-readable medium of claim 15, wherein the planned group change operation comprises the split of the node device from the group of node devices within the cluster of node devices, and wherein the operations further comprise determining that each respective node device of the group of node devices has completed the respective group change preparation operation by observing whether a drain goal is met at respective node devices of the group of node devices.

20. The non-transitory machine-readable medium of claim 15, wherein the operations further comprise measuring a time interval beginning after notifying the group of node devices of the planned group change operation.

* * * * *